(12) United States Patent
Honda et al.

(10) Patent No.: US 10,903,708 B2
(45) Date of Patent: Jan. 26, 2021

(54) BRUSHLESS MOTOR WITH A STATOR COMPRISING A BOBBIN AND A CONDUCTOR WIRE WOUND ON THE BOBBIN BY BEING OVERLAPPED IN PLURAL LAYERS

(71) Applicant: Aisan Kogyo Kabushiki Kaisha, Obu (JP)

(72) Inventors: Yoshihiko Honda, Obu (JP); Akira Hamajima, Obu (JP); Ryohei Otaka, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 295 days.

(21) Appl. No.: 16/026,259

(22) Filed: Jul. 3, 2018

(65) Prior Publication Data
US 2019/0027992 A1     Jan. 24, 2019

(30) Foreign Application Priority Data

Jul. 18, 2017  (JP) .................. 2017-139365

(51) Int. Cl.
*H02K 3/34*     (2006.01)
*H02K 3/32*     (2006.01)
(Continued)

(52) U.S. Cl.
CPC ............. *H02K 3/345* (2013.01); *H02K 3/28* (2013.01); *H02K 3/325* (2013.01); *H02K 3/18* (2013.01); *H02K 3/50* (2013.01); *H02K 2203/12* (2013.01)

(58) Field of Classification Search
CPC .. H02K 3/04; H02K 3/18; H02K 3/28; H02K 3/32; H02K 3/34; H02K 3/345;
(Continued)

(56) References Cited

U.S. PATENT DOCUMENTS 9,369,022 B2   6/2016 Hayakawa et al.
9,476,394 B2   10/2016 Hayakawa et al.
(Continued)

FOREIGN PATENT DOCUMENTS

JP   2002112483 A   4/2002
JP   2014003878 A   1/2014
JP   2014236651 A   12/2014

*Primary Examiner* — Jue Zhang
*Assistant Examiner* — David A. Singh
(74) *Attorney, Agent, or Firm* — Shumaker, Loop & Kendrick, LLP

(57) ABSTRACT

A stator of a brushless motor may include a core; a bobbin including a pair of side surfaces, an inner wall, and an outer wall; a conductor wire wound by being overlapped in plural layers; and a resin layer covering the bobbin and the conductor wire. A profile of the conductor wire may become larger towards an outer circumferential side of the stator. Among portions of the conductor wire arranged along a rotary axis direction of a rotor on at least one side surface included in the pair of side surfaces and located on an innermost circumferential side of the stator in the respective plural layers, a portion of the conductor wire exposed to the resin layer and separated from the inner wall and the outer wall may be tilted from an inner circumferential side of the stator toward the outer circumferential side of the stator.

5 Claims, 10 Drawing Sheets

(51) Int. Cl.
*H02K 3/28* (2006.01)
*H02K 3/18* (2006.01)
*H02K 3/50* (2006.01)

(58) Field of Classification Search
CPC ............ H02K 3/46; H02K 3/52; H02K 3/522;
H02K 5/04; H02K 5/12; H02K 5/22;
H02K 5/225; H02K 11/0094; H02K
2203/09; H02K 2203/12; H02K 3/325;
H02K 3/50
USPC ........................... 310/71, 195, 208, 215, 260
See application file for complete search history.

(56) References Cited

U.S. PATENT DOCUMENTS

| | | | | |
|---|---|---|---|---|
| 2013/0315759 | A1* | 11/2013 | Hayakawa | ............. H02K 3/345 |
| | | | | 417/420 |
| 2014/0363320 | A1* | 12/2014 | Hayakawa | ............... H02K 3/46 |
| | | | | 417/420 |

* cited by examiner

BRUSHLESS MOTOR WITH A STATOR COMPRISING A BOBBIN AND A CONDUCTOR WIRE WOUND ON THE BOBBIN BY BEING OVERLAPPED IN PLURAL LAYERS

TECHNICAL FIELD

The technique disclosed herein relates to a brushless motor.

BACKGROUND

Japanese Patent Application Publication No. 2014-236651 describes a brushless motor provided with a rotor and a stator. The stator includes a core, a bobbin arranged on the core, and conductor wires wound on the bobbin. Each conductor wire is wound on the bobbin in layers. The core, the bobbin, and the conductor wires are integrated by resin mold.

SUMMARY

When a resin layer is to be molded by insert molding by arranging a core, a bobbin, and conductor wires in a molding die, there is a case where molten resin cannot properly fill in the molding die due to flow of the molten resin being hindered within the molding die. Due to this, a defect may be generated in the resin layer. The disclosure herein provides a technique that suppresses defects of a resin layer.

A brushless motor may comprise a rotor; and a stator arranged on an outer circumferential side of the rotor. The stator may comprise a core circumscribing the rotor; a bobbin covering the core and comprising a pair of side surfaces along a rotary axis of the rotor, an inner wall located on an inner circumferential side of the pair of side surfaces, and an outer wall located on an outer circumferential side of the pair of side surfaces; a conductor wire wound on the bobbin by being overlapped in plural layers; and a resin layer covering the bobbin and the conductor wire. A profile of the conductor wire may become larger towards an outer circumferential side of the stator. Among portions of the conductor wire arranged along a rotary axis direction of the rotor on at least one side surface included in the pair of side surfaces and located on an innermost circumferential side of the stator in the respective plural layers, a portion of the conductor wire exposed to the resin layer and separated from the inner wall and the outer wall may be tilted from an inner circumferential side of the stator toward the outer circumferential side of the stator.

DETAILED DESCRIPTION

Figure 1:
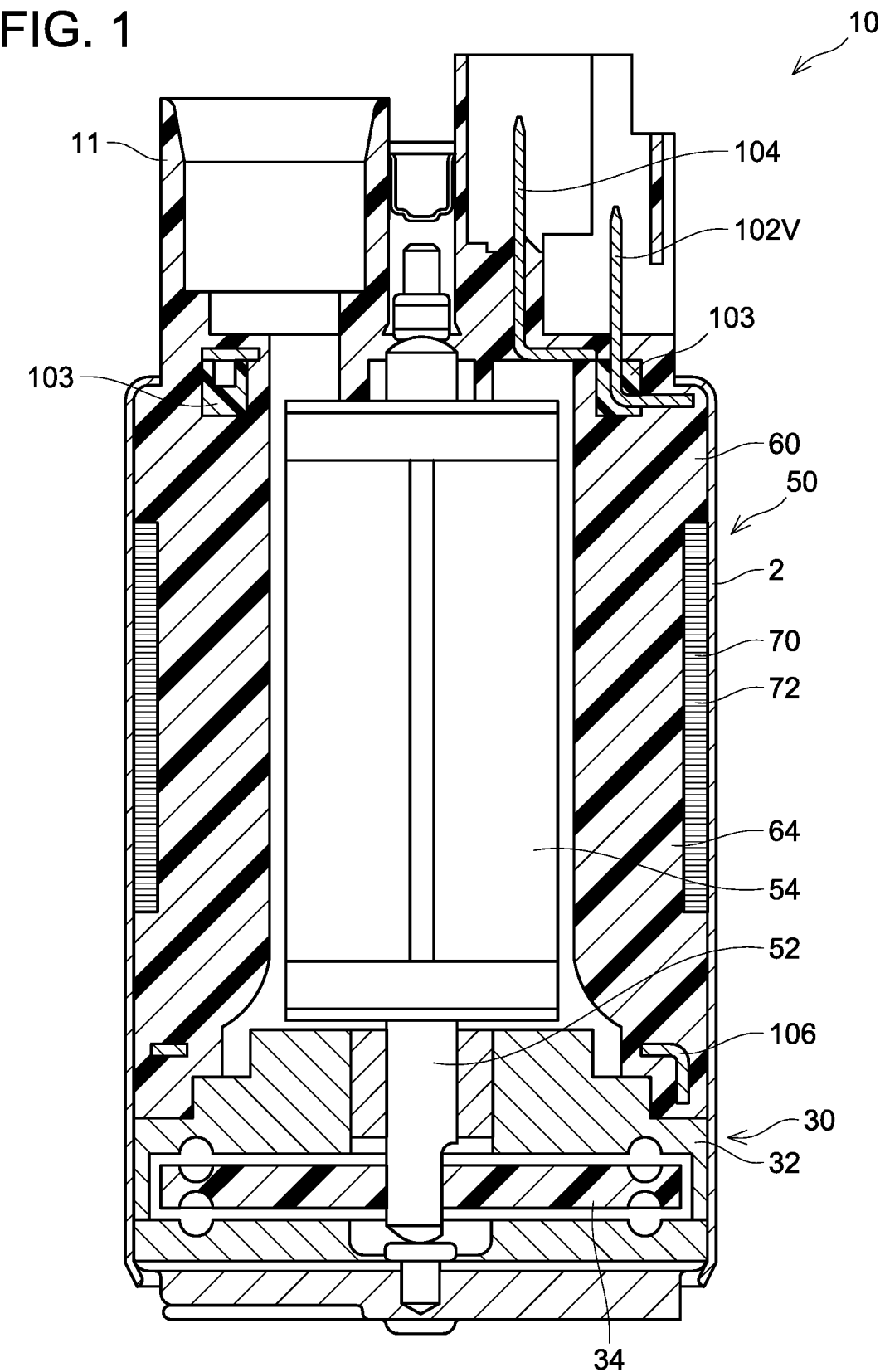
FIG. 1 shows a vertical cross-sectional view of a fuel pump of an embodiment.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved brushless motors, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The technique disclosed herein relates to a brushless motor may comprise a rotor; and a stator arranged on an outer circumferential side of the rotor. The stator may comprise a core circumscribing the rotor; a bobbin covering the core and comprising a pair of side surfaces along a rotary axis of the rotor, an inner wall located on an inner circumferential side of the pair of side surfaces, and an outer wall located on an outer circumferential side of the pair of side surfaces; a conductor wire wound on the bobbin by being overlapped in plural layers; and a resin layer covering the bobbin and the conductor wire. A profile of the conductor wire may become larger towards an outer circumferential side of the stator. Among portions of the conductor wire arranged along a rotary axis direction of the rotor on at least one side surface included in the pair of side surfaces and located on an innermost circumferential side of the stator in the respective plural layers, a portion of the conductor wire exposed to the resin layer and separated from the inner wall and the outer wall may be tilted from an inner circumferential side of the stator toward the outer circumferential side of the stator.

As one cause of defect generation in the resin layer, it has been found that the conductor wire wound on the bobbin may loosen off of the bobbin by molten resin flowing in a molding die and close a flow passage of the molten resin. In the above brushless motor, upon forming the resin layer, the core, the bobbin, and the conductor wire wound on the bobbin are arranged in the molding die so that the molten resin flows, with respect to the portion of the conductor wire tilted from the inner circumferential side toward the outer circumferential side of the stator, from a side of the portion of the conductor wire located on the outer circumferential side of the stator toward a side of the portion of the conductor wire located on the inner circumferential side of the stator. By this arrangement, the portion of the conductor wire tilted from the inner circumferential side toward the outer circumferential side of the stator is pressed toward the outer circumferential side of the stator by the molten resin flowing in the molding die. The portion of the conductor wire tilted from the inner circumferential side toward the outer circumferential side of the stator is located on an innermost circumferential side of the stator in the layer. Since the profile of the conductor wire becomes larger toward the outer circumferential side of the stator in a radial direction, the conductor wire cannot move greatly toward the outer circumferential side even when pressed by the molten resin. Moreover, a portion of the conductor wire located on the outer circumferential side of the stator can be pressed to the outer circumferential side. According to this configuration, the conductor wire can be prevented from loosening off of the bobbin by being pressed by the molten resin. Due to this, the conductor wire can be prevented from blocking the flow passage of the molten resin. As a result, defects in the resin layer can be suppressed.

Among portions of the conductor wire arranged along the rotary axis direction of the rotor on the one side surface and located in an outermost layer of the plural layers, a portion of the conductor wire located on the outer circumferential side of the stator may be arranged along the outer wall. According to this configuration, the molten resin can be suppressed from flowing in between the outer wall and the portion of the conductor wire arranged along the outer wall. As a result, the conductor wire can be suppressed from being pressed toward the inner circumferential side by the molten resin flowing in between the conductor wire and the outer wall, and from loosening off of the bobbin.

A number of turns of the conductor wire may increase toward the outer circumferential side of the stator. According to this configuration, the number of turns is increased so that the profile of the conductor wire can be made larger toward the outer circumferential side of the stator.

Among portions of the conductor wire arranged along the rotary axis direction of the rotor on another side surface included in the pair of side surfaces and located on the innermost circumferential side of the stator in the respective plural layers, a portion of the conductor wire exposed to the resin layer and separated from the inner wall and the outer wall may be arranged parallel to the rotary axis direction of the rotor. By arranging the portions of the conductor wire on the other side surface along the inner wall, the conductor wire can be wound easily as compared to a case of arranging it in a tilted state.

A surface of the inner wall facing the pair of side surfaces may be parallel to the rotary axis direction. Among the portions of the conductor wire arranged along the rotary axis direction on the one side surface included in the pair of side surfaces and located on the innermost circumferential side of the stator in the respective plural layers, a portion of the conductor wire in contact with the inner wall may be arranged parallel to the rotary axis direction. According to this configuration, the portion of the conductor wire arranged along the inner wall can be suppressed from loosening off of the bobbin by being pressed by the molten resin.

Embodiment

As shown in FIG. 1, a motor unit 50 according to an embodiment is used in a fuel pump 10. The fuel pump 10 is arranged in a fuel tank (not shown), and is configured to supply fuel (such as gasoline) to an engine (not shown) of a vehicle such as an automobile. The fuel pump 10 includes the motor unit 50 and a pump unit 30. The motor unit 50 and the pump unit 30 are arranged in a housing 2. The housing 2 has a cylinder shape with its both ends opened.

The pump unit 30 includes a casing 32 and an impeller 34. The casing 32 closes an opening at the lower end of the housing 2. A suction port (not shown) is provided at a lower end of the casing 32. A communicating hole (not shown) communicating inside of the casing 32 and the motor unit 50 is provided at an upper end of the casing 32. The impeller 34 is accommodated in the casing 32.

The motor unit 50 is located above the pump unit 30. The motor unit 50 is a brushless motor, and is a three-phase motor. The motor unit 50 includes a rotor 54 and a stator 60. The rotor 54 includes permanent magnets. A shaft 52 is penetrating a center of the rotor 54 and fixed thereat. A lower end of the shaft 52 is inserted to a center of the impeller 34 and penetrates therethrough. The rotor 54 is supported by bearings arranged at both ends of the shaft 52 so as to be rotatable with the shaft 52 as a center. Hereinbelow, a direction parallel to an axial direction of the shaft 52 will be termed a "rotary axis direction X". In this embodiment, top and bottom are defined in a state shown in FIG. 1. That is, the pump unit 30 is located "below" as seen from the motor 50, and the motor unit 50 is located "above" as seen from the pump unit 30.

Figure 2:
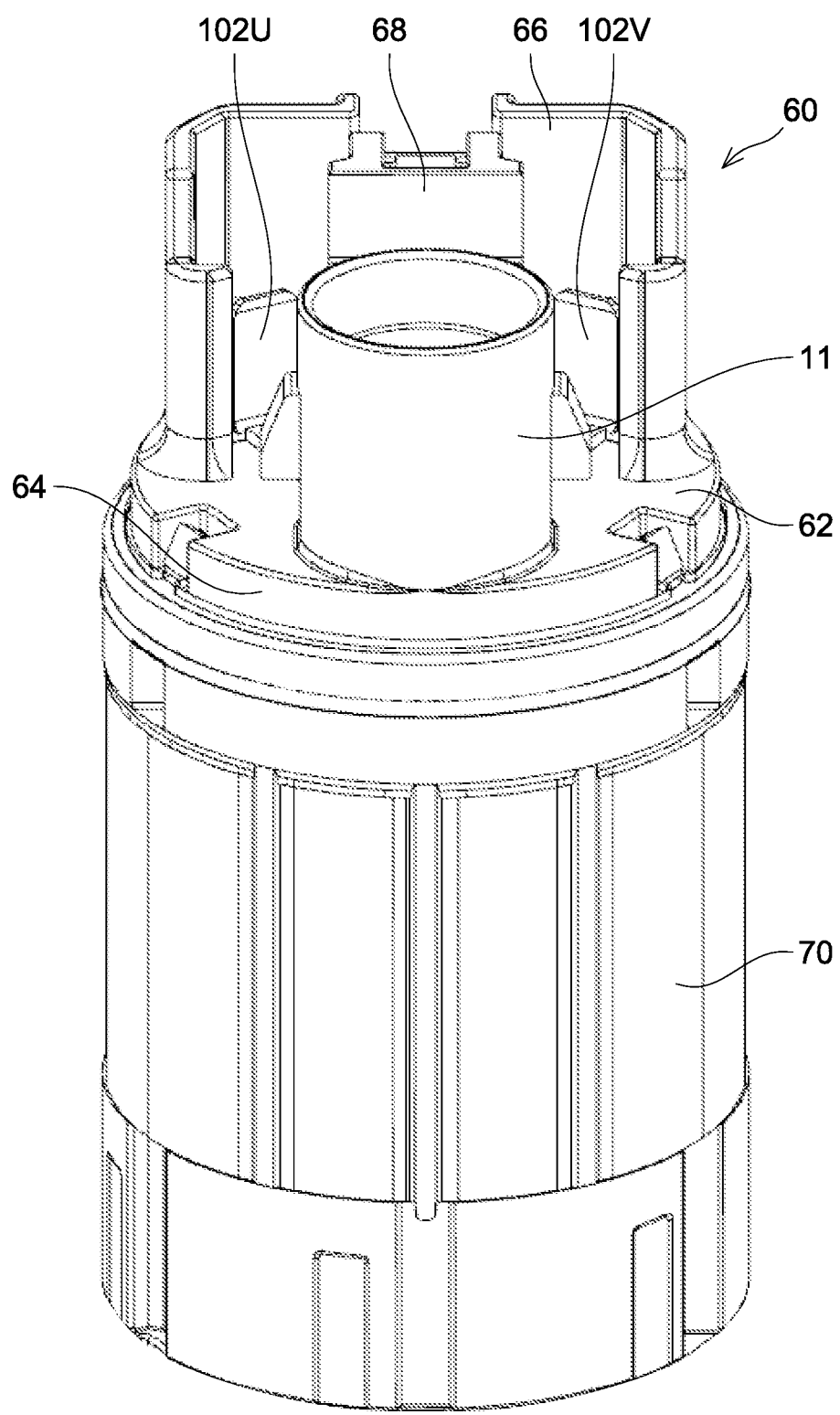
FIG. 2 shows a perspective view of a stator of the embodiment.
Figure 3:
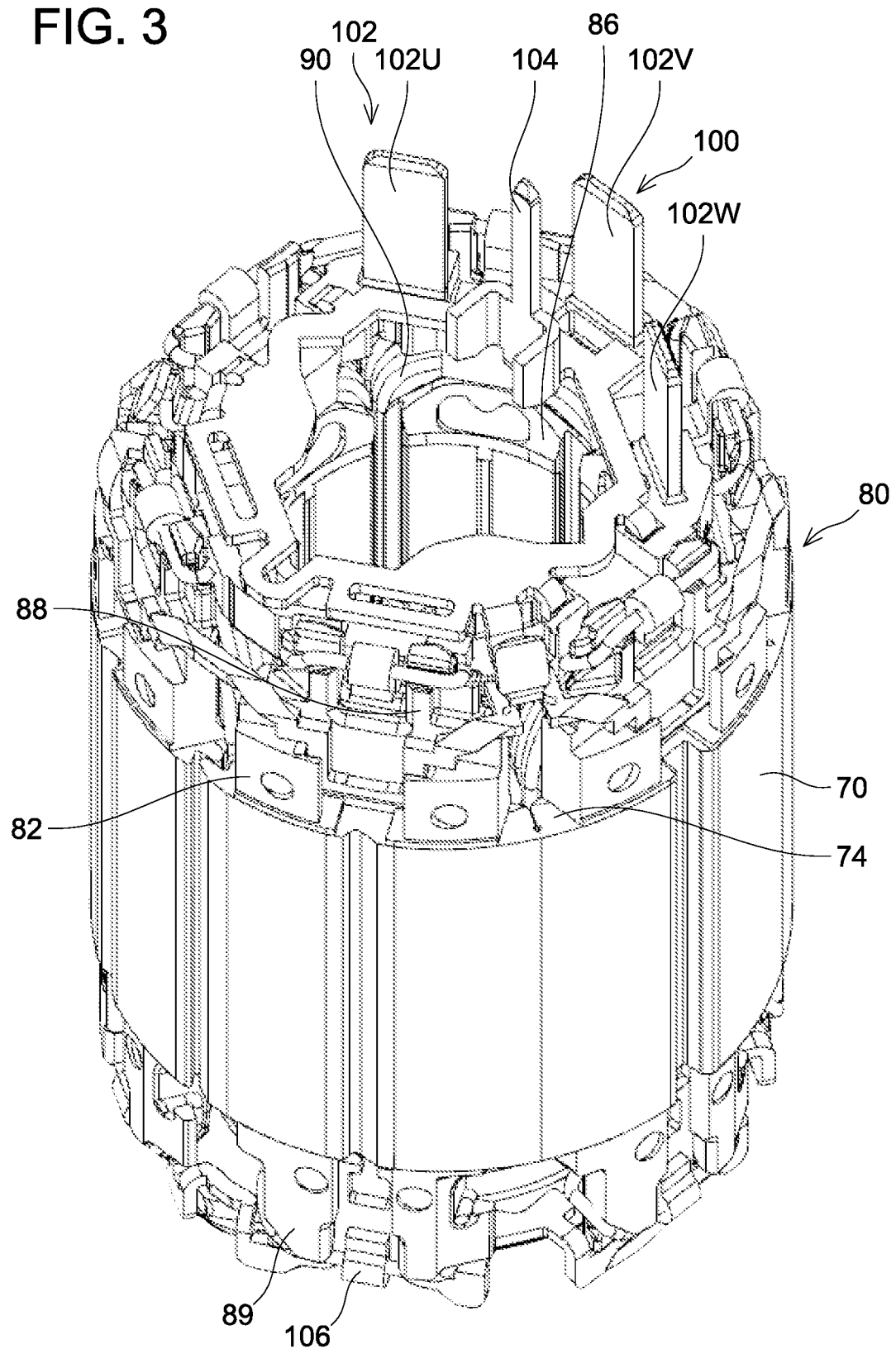
FIG. 3 shows a perspective view of the stator in a state where a resin layer of the embodiment is detached.
Figure 4:
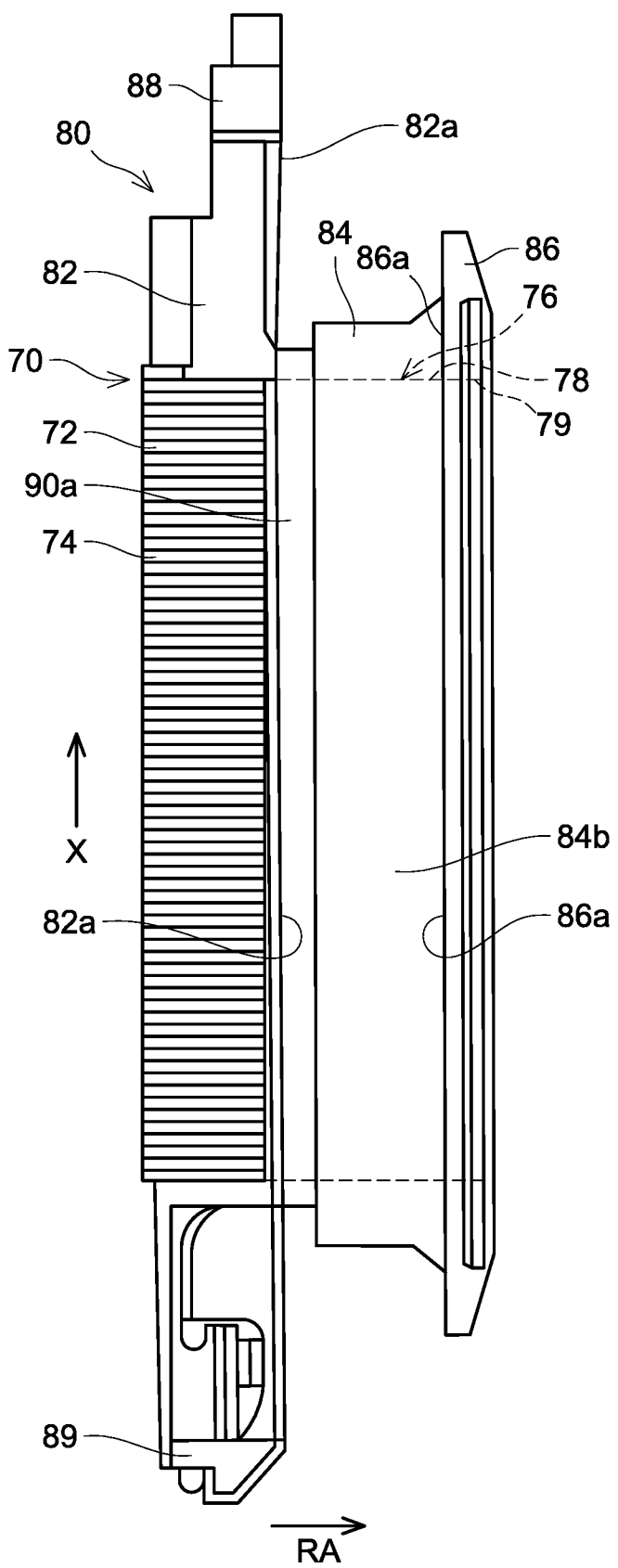
FIG. 4 shows a diagram seeing a bobbin of the embodiment covering a tooth in a lateral plane parallel to a rotary axis direction.

As shown in FIGS. 2 to 4, the stator 60 includes a resin layer 62, a core 70, a bobbin 80, a plurality of conductor wires 90, and a plurality of terminals 100. FIG. 2 shows a perspective view of the stator 60, and FIG. 3 shows a perspective view of the core 70, the bobbin 80, the conductor wires 90, and the terminals 100 in a state where the resin layer 62 is detached. FIGS. 2 and 3 see the stator from different viewpoint angles. The core 70 is constituted of laminated core plates 72 (see FIG. 1). In FIG. 1, a gap between the core plates 72 and the housing 2 is omitted. Further, the core plates 72 are exposed on a side surface of the core 70, however, indication of the core plates 72 is omitted in FIG. 3. The plurality of core plates 72 is laminated in an up and down direction, and each core plate 72 is constituted of a magnetic material. This core plate group (72, 72, . . . ) includes a stator yoke 74 and a plurality (six, in this embodiment) of teeth 76. FIG. 4 shows a diagram seeing a side surface 84b of the bobbin 80 covering one tooth 76. The teeth 76 have an identical configuration. Parts of the bobbin 80 covering these teeth 76 have an identical configuration. The stator yoke 74 has a cylinder shape arranged on a side surface of the stator 60. The plurality of teeth 76 is arranged at a regular interval on an inner circumferential surface of the stator yoke 74, and extends toward the rotor 54. Each tooth 76 includes a base 78 extending in a radial direction of the stator 60 and an inner circumferential end 79 extending along an outer shape of the rotor 54.

The bobbin 80 covers the core 70. The bobbin 80 includes an outer wall 82, a plurality (six, in this embodiment) of inner walls 86, and a plurality (six, in this embodiment) of intermediate portions 84. The outer wall 82 covers an upper end, a lower end, and an inner surface of the stator yoke 74. The outer wall 82 includes conductor wire supports 88, 89 for supporting the conductor wires 90 at its upper and lower ends, respectively. The upper and lower ends of the outer wall 82 are connected by an inner circumferential surface 82a located on a stator yoke 74's inner surface side. The inner circumferential surface 82a of the outer wall 82 has a flat shape parallel to the rotary axis direction X.

Figure 8:
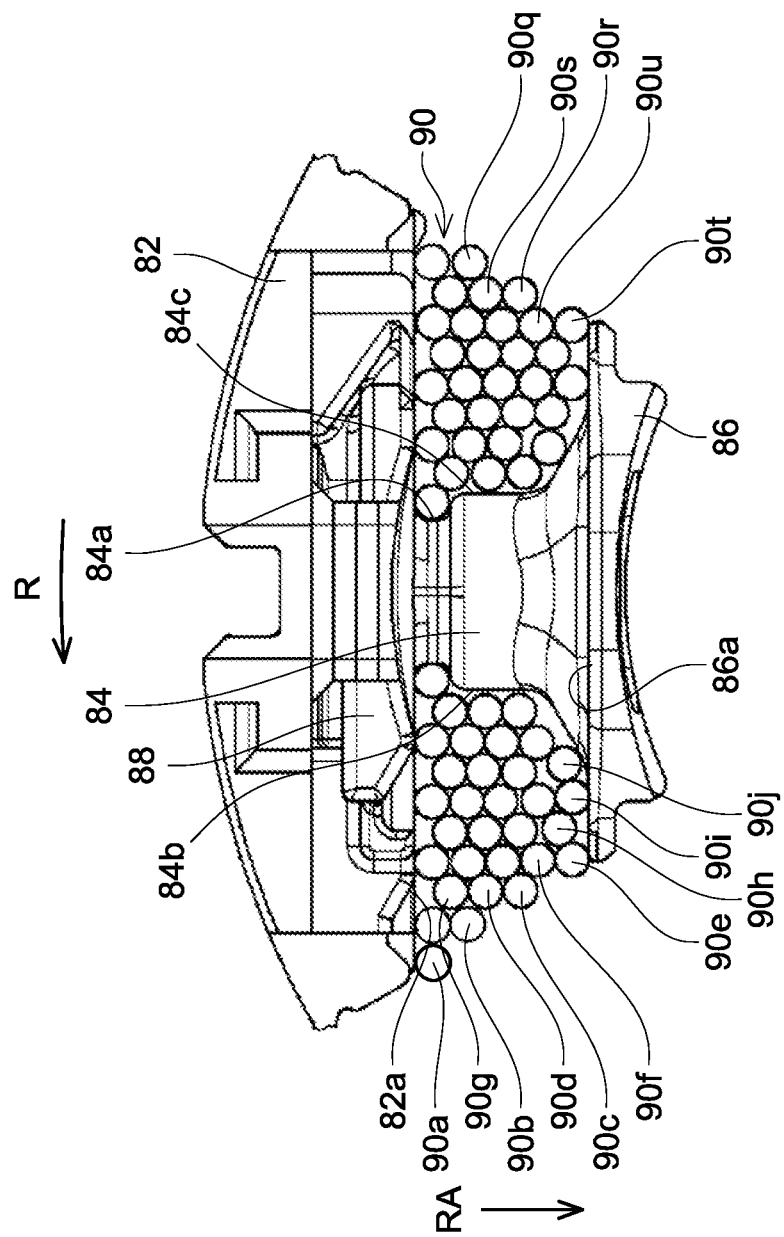
FIG. 8 shows a cross-sectional view of a core shape and the conductor wire portions.

An outer end of each of the plurality of intermediate portions 84 is connected to an inner circumferential side of the outer wall 82. Each intermediate portion 84 covers its corresponding tooth 76 by circumscribing it along four side surfaces of the base 78 between outer and inner ends thereof. FIG. 8 shows a diagram seeing the bobbin 80 covering one tooth 76 from above. In FIG. 8, the conductor wire 90 is shown in a cross section by which an upper-end side surface of the bobbin 80 can be seen. The conductor wire 90 is shown by a cross section taken along a direction vertical to the rotary axis direction X at a height same as a height of a lower-end side surface of the intermediate portion 84 (hatching is omitted). The intermediate portion 84 becomes gradually larger toward the inner circumferential side by expanding in both a rotary direction R of the rotor 54 and the rotary axis direction X. The inner wall 86 is connected to an inner circumferential end of the intermediate portion 84. The inner wall 86 covers the inner circumferential end 79 of the teeth 76. An outer circumferential surface 86a of the inner wall 86 has a flat shape parallel to the rotary axis direction X.

As shown in FIG. 4, the inner circumferential surface 82a of the outer wall 82 extends upward beyond an upper end of the intermediate portion 84, and extends downward beyond a lower end of the intermediate portion 84. Further, as shown in FIG. 8, the inner circumferential surface 82a extends beyond both ends of the intermediate portion 84 in the rotary direction R. As shown in FIG. 4, the outer circumferential surface 86a of the inner wall 86 extends upward beyond the upper end of the intermediate portion 84, and extends downward beyond the lower end of the intermediate portion 84. Further, as shown in FIG. 8, the outer circumferential surface 86a of the inner wall 86 extends beyond the both ends of the intermediate portion 84 in the rotary direction R.

Each of the intermediate portions 84 has corresponding one of the conductor wires 90 wound thereon by being overlapped in plural layers. In each layer, one or more turns of the conductor wire 90 are arranged adjacent to each other. A starting end of each of the conductor wires 90 is engaged with one of the conductor wire supports 89 at the lower end of the outer wall 82. Each conductor wire 90 is wound to extend from the conductor wire support 89 along a groove 84a located at an end of the intermediate portion 84 on an outer wall 82 side, and to circumscribe the intermediate portion 84 along the groove 84a. The conductor wire 90 is wound along side surfaces of the intermediate portion 84 toward the inner circumferential side. When the conductor wire 90 is wound up to the inner wall 86, the conductor wire 90 is further wound so as to be arranged along and over boundaries between adjacent turns of the conductor wire 90 in a first layer that has already been wound.

Each conductor wire 90 is wound by being overlapped in the plural layers. A number of layers of the conductor wire 90, that is, a number of turns thereof, increases toward a radially outer side of the stator 60. As a result, a profile of each of the conductor wires 90 becomes gradually larger toward an outer circumferential side of the stator 60. As shown in FIG. 8, among portions of the conductor wire 90 arranged on the side surface 84b of the intermediate portion 84, a conductor wire portion 90a located in an outermost layer is arranged along the inner circumferential surface 82a of the outer wall 82 and extends to the conductor wire support 88. The conductor wire portion 90a is in contact with the inner circumferential surface 82a.

Figure 6:
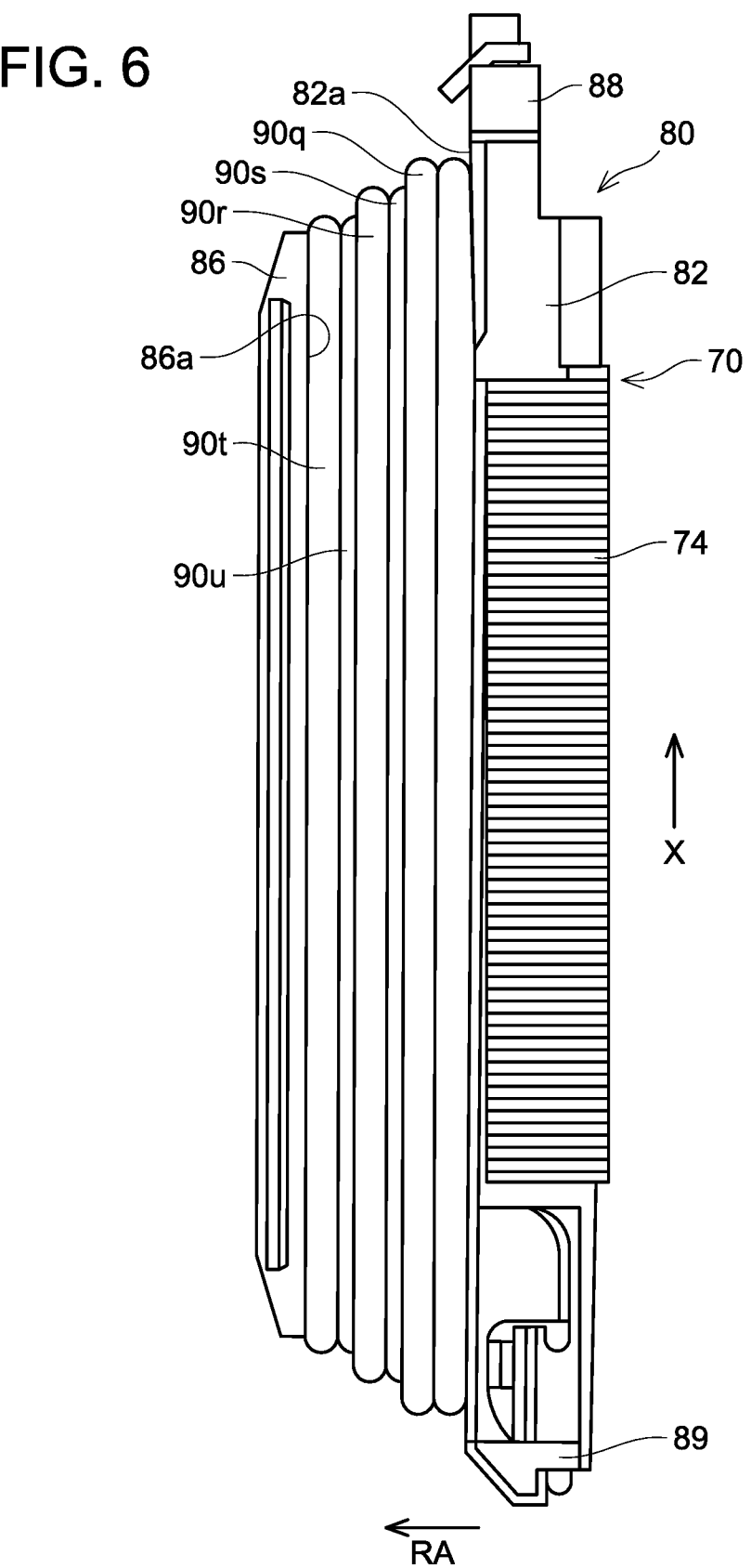
FIG. 6 shows a diagram indicating conductor wire portions of the embodiment arranged on another side surface of the bobbin parallel to the rotary axis direction.
Figure 7:
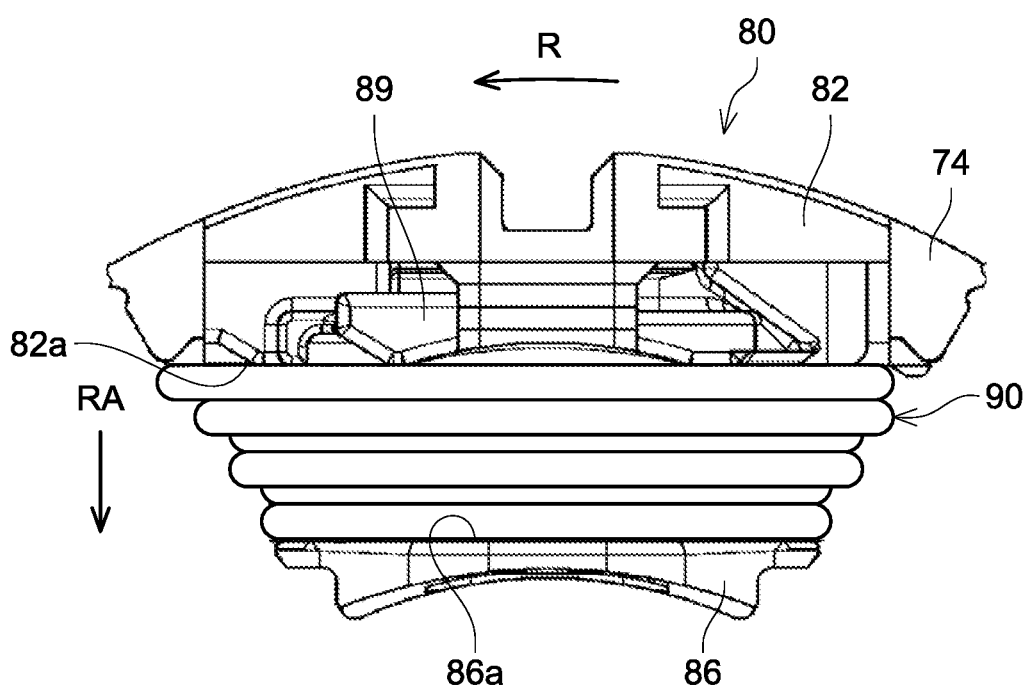
FIG. 7 shows a diagram indicating conductor wire portions of the embodiment arranged on an upper-end side surface of the bobbin.

As shown in FIG. 7, among portions of the conductor wire 90 arranged on the upper-end side surface of the bobbin 80, portions of the conductor wire 90 that do not have another portion of the conductor wire 90 being overlapped on the outer side thereof and are exposed to the resin layer 62 to be described later, that is, in contact therewith, are arranged vertical to a radial direction RA. Similarly, portions of the conductor wire 90 arranged on the lower-end side surface of the bobbin 80 are arranged vertical to the radial direction. Further, as shown in FIG. 6, among portions of the conductor wire 90 arranged on a side surface 84c of the pair of side surfaces 84b, 84c of the bobbin 80 (see FIG. 8) that extend parallel to the rotary axis direction X, conductor wire portions 90q, 90r, 90s, 90t, 90u that do not have another portion of the conductor wire 90 being overlapped on the outer sides thereof and are exposed to the resin layer 62 to be described later, that is, in contact therewith, are arranged parallel to the rotary axis direction X.

Figure 5:
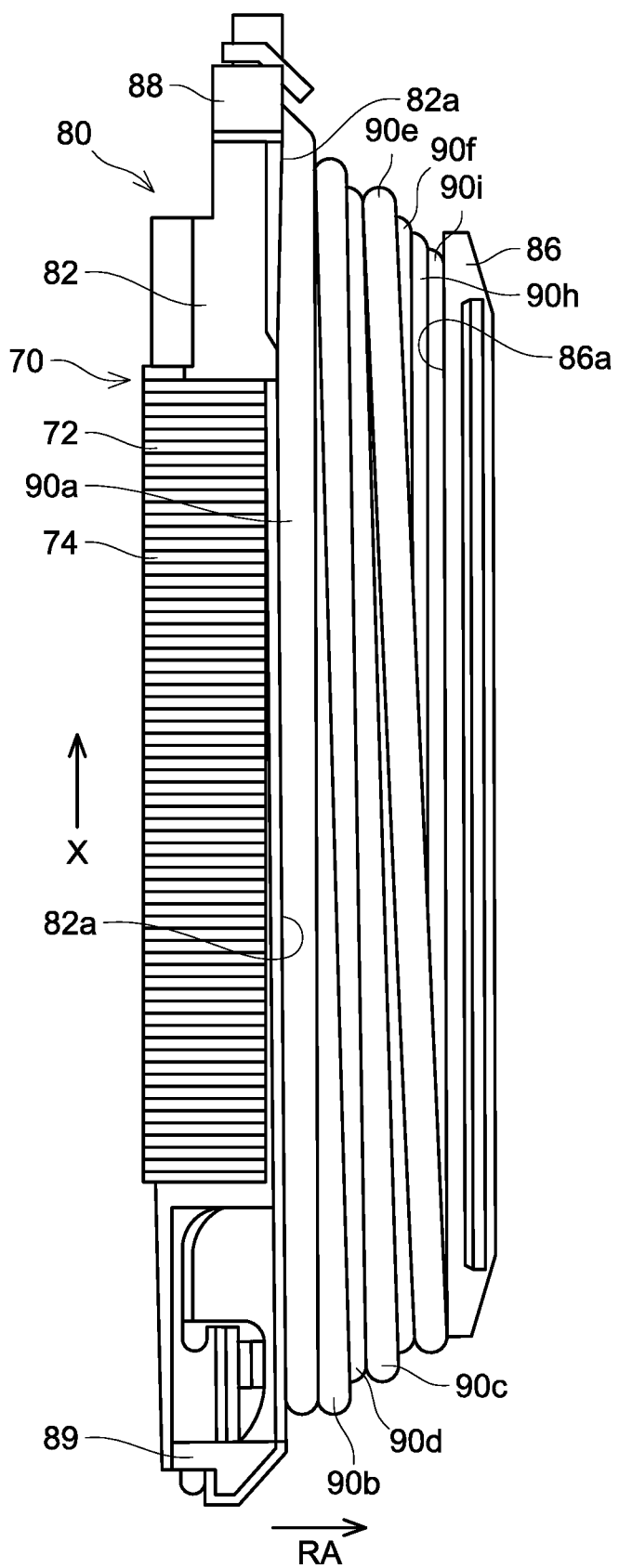
FIG. 5 shows a diagram indicating conductor wire portions of the embodiment arranged on one side surface of the bobbin parallel to the rotary axis direction.

Further, as shown in FIG. 5, among the portions of the conductor wire 90 arranged on the side surface 84b, the conductor wire portion 90a in the outermost layer (that is, a tenth layer), a conductor wire portion 90b in a ninth layer, conductor wire portions 90c, 90d in an eighth layer, and conductor wire portions 90e, 90f in a seventh layer do not have another portion of the conductor wire 90 being overlapped on the outer sides thereof, and are exposed to the resin layer 62 to be described later, that is, in contact therewith. Among the conductor wire portions 90a, 90b, 90c, 90d, 90e, 90f, the conductor wire portions 90a, 90b, 90c, 90e are located on an innermost circumferential side of their layers. Among the conductor wire portions 90a, 90b, 90c, 90e, the conductor wire portions 90b, 90c do not contact the outer wall 82 or the inner wall 86. The conductor wire portions 90b, 90c are tilted from top to bottom toward the inner circumferential side. Further, the conductor wire portions 90d, 90g in the eighth layer are also tilted from top to bottom toward the inner circumferential side. Moreover, the conductor wire portion 90e located on the innermost circumferential side in the seventh layer is also tilted from top to bottom toward the inner circumferential side. On the other hand, as shown in FIG. 8, among the conductor wire portions 90 in the first to seventh layers, conductor wire portions 90h, 90i, 90j located on the innermost circumferential side of their layers are arranged in parallel in the rotary axis direction X along the inner wall 86. The conductor wire portion 90i is arranged in contact with the outer circumferential surface 86a of the inner wall 86.

The plurality of terminals 100 includes a plurality (three, in this embodiment) of power conduction terminals 102, a ground terminal 104, and a common terminal 106. The common terminal 106 is arranged at the lower end of the stator 60, and is electrically connected to the portions of the respective conductor wires 90 supported by the conductor wire supports 89.

The power conduction terminals 102 include power conduction terminals 102U, 102V, 102W for supplying U-phase current, V-phase current, and W-phase current respectively to the conductor wires 90. Each of the power conduction terminals 102U, 102V, 102W is attached to the bobbin 80 via a supporting member 103. Each of the power conduction terminals 102U, 102V, 102W is electrically connected to its corresponding conductor wire 90 at the portion thereof supported by the conductor wire support 88. The ground terminal 104 is electrically connected to the housing 2.

The resin layer 62 covers entireties of the bobbin 80, the conductor wires 90, and the common terminal 106, as well as lower end portions of the power conduction terminals 102 and the ground terminal 104. The resin layer 62 is provided by so-called insert molding which carries out resin molding by arranging a combination of the core 70, the bobbin 80, the conductor wires 90, and the plurality of terminals 100 in a state shown in FIG. 9 within a molding die.

The resin layer 62 includes an outer wall 64, a partition wall 66, a connector 68, and a discharge outlet 11. The outer wall 64, the partition wall 66, the connector 68, and the discharge outlet 11 are molded integrally. "Molded integrally" means that the outer wall 64, the partition wall 66, the connector 68, and the discharge outlet 11 are molded by one instance of resin molding, and they are connected seamlessly. The outer wall 64 covers upper and lower end portions and an inner circumferential portion of the core 70. The power conduction terminals 102U, 122V, 102W and the ground terminal 104 protrude upward from an upper end of the outer wall 64. The partition wall 66, the connector 68, and the discharge outlet 11 are arranged at the upper end of the outer wall 64. The discharge outlet 11 has a cylinder shape. The discharge outlet 11 communicates with the pump unit 30 through an inner side of the core 70. The partition wall 66 covers the power conduction terminals 102 from the outer circumferential side. The connector 68 is a connector for connecting the terminals 102, 104 and external terminals.

Figure 9:
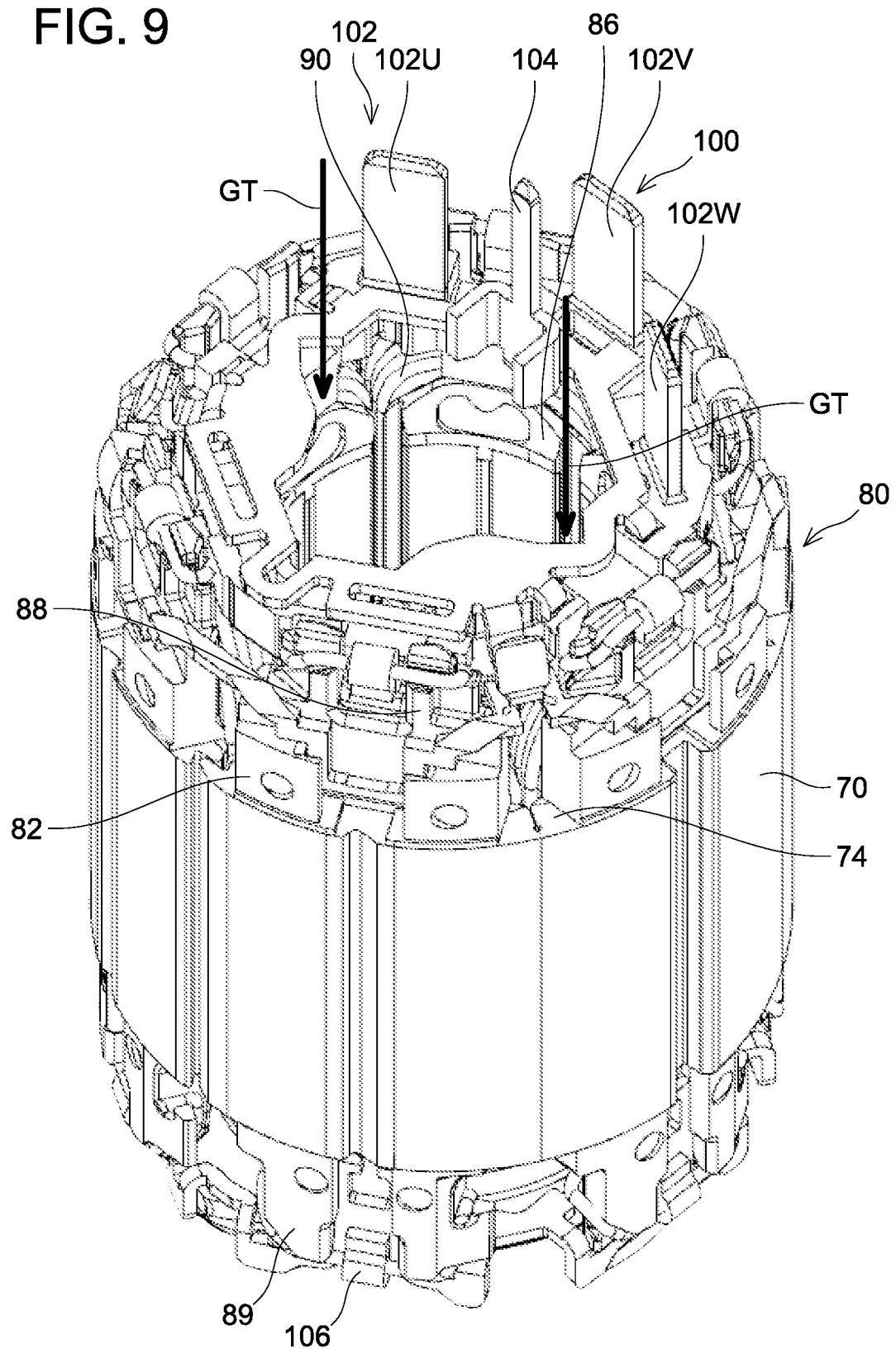
FIG. 9 shows a perspective view indicating a position of a gate for molding the resin layer of the embodiment.

FIG. 9 shows a position of a gate GT in the molding die from which molten resin is introduced to a cavity in the molding die. The gate GT is arranged above the upper end of the bobbin 80 and on a somewhat inner side from an inner circumferential end of the bobbin 80. The molten resin is introduced to the cavity from the gate GT with pressure applied thereto. The molten resin flows in the cavity from top to bottom while coming into contact with the conductor wire portions 90 exposed externally among the conductor wire portions 90. At this occasion, the conductor wire portions 90b, 90c, 90e tilted to the inner circumferential side from top to bottom are pressed downward and toward an outer circumferential direction by the molten resin. Since the profile of each of the conductor wires 90 becomes gradually larger toward the outer circumferential side of the stator 60, a linear length of the conductor wire portions 90b, 90c is short and thus they are suppressed from moving toward the outer circumference. The conductor wire portions 90 at other positions are restricted from moving by the outer wall 82 and the inner walls 86. Due to this, the conductor wires 90 can be suppressed from loosening off of the bobbin 80. As a result, the conductor wires 90 can be suppressed from hindering the flow of the molten resin, and generation of defects in the resin layer 62 can be suppressed.

Each of the conductor wire portions 90a in the corresponding outermost layer is arranged in contact with the inner circumferential surface 82a of the outer wall 82. According to this configuration, the molten resin can be suppressed from flowing in between the outer wall 82 and the conductor wire portions 90a arranged along the outer wall 82. As a result, the conductor wire portions 90a can be suppressed from loosening off of the bobbin 80 by being pressed toward the inner circumferential side by the molten resin flowing in between the conductor wire portions 90a and the outer wall 82.

The number of layers of each conductor wire 90, that is, the number of turns thereof increases toward the outer side in the radial direction of the stator 60. According to this configuration, the profile of each conductor wire 90 can be enlarged toward the outer circumferential side of the stator 60.

Among the portions of each conductor wire 90 arranged on its corresponding side surface 84c, the conductor wire portions 90q, 90r, 90s, 90t, 90u that do not have another portion of the conductor wire 90 being overlapped on the outer side thereof and are exposed to the resin layer 62, that is, in contact therewith, are arranged parallel to the rotary axis direction X. According to this configuration, each of the conductor wires can be wound easily as compared to a case of arranging the conductor wire portions 90q, 90r, 90s to be tilted similar to the conductor wire portions 90b, 90c, 90d on the side surface 84b.

Since the conductor wire portions 90h, 90i, 90j on the side surface 84b are arranged along the inner wall 86, they can be suppressed from loosening off of the bobbin 80 by being pressed by the molten resin. The same applies to the conductor wire portions 90 arranged on the side surface 84c.

While specific examples of the present invention have been described above in detail, these examples are merely illustrative and place no limitation on the scope of the patent claims. The technique described in the patent claims also encompasses various changes and modifications to the specific examples described above.

(1) In the above embodiment, the gate GT is located above the bobbin 80. However, the position of the gate GT is not limited to being above the bobbin 80, and may be positioned above the bobbin 80 and on the outer circumferential side. In this case, the molten resin introduced from the gate GT simply needs to flow from top to bottom relative to the conductor wire portions 90b, 90c tilted relative to the rotary axis direction X.

(2) In the above embodiment, the conductor wire portions 90b, 90c, 90d, 90g are tilted from top to bottom toward the inner circumferential side. However, at least the conductor wire portions 90b, 90c may be tilted from bottom to top toward the inner circumferential side. In this case, the combination of the core 70, the bobbin 80, the conductor wires 90, and the plurality of terminals 100 may be arranged in the molding die so that the molten resin introduced from the gate GT flows from bottom to top relative to the conductor wire portions 90b, 90c tilted relative to the rotary axis direction X.

(3) In the above embodiment, as shown in FIG. 8, among the portions of the conductor wire 90 arranged on the side surface 84c, the conductor wire portions 90q, 90r that do not have another portion of the conductor wire 90 being overlapped on the outer side thereof, are exposed to the resin layer 62, located on the innermost circumferential side of the respective layers thereof, and do not contact the outer wall 82 nor the inner wall 86 are arranged parallel to the rotary axis direction X. However, at least one of the conductor wire portions 90q, 90r may be tilted relative to the rotary axis direction X similar to the conductor wire portions 90b, 90c.

Figure 10:
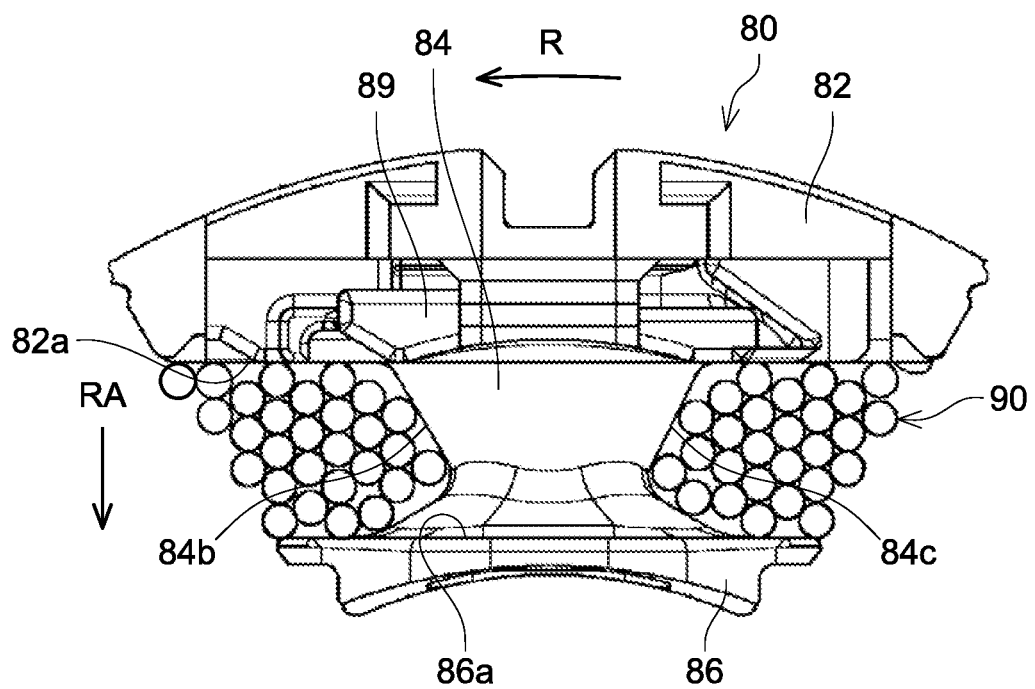
FIG. 10 shows a cross-sectional view of a core shape and conductor wire portions of a variant.

(4) In the above embodiment, an outer shape of each of the conductor wires 90 is made larger toward the outer circumferential side of the stator 60 by increasing the number of turns of the conductor wire 90 from the inner circumferential side toward the outer circumferential side of the stator 60. However, as shown in FIG. 10, the outer shape of each of the conductor wires 90 may be made larger toward the outer circumferential side of the stator 60 by widening the corresponding intermediate portion 84 of the bobbin 80 from the inner circumferential side toward the outer circumferential side of the stator 60. In this case, the number of turns of the conductor wire 90 may not increase from the inner circumferential side toward the outer circumferential side of the stator 60.

(5) In the above embodiment, each conductor wire portion 90*a* in the corresponding tenth layer is arranged along the inner circumferential surface of the outer wall 82. However, the conductor wire portions 90*a* may not be arranged along the inner circumferential surfaces of the outer wall 82, and for example, they may be arranged to be separated from the inner circumferential surfaces of the outer wall 82.

(6) In the above embodiment, among the conductor wire portions 90 in the first to seventh layers, the conductor wire portions 90*h*, 90*i*, 90*j* located on the inner most circumferential side in their respective layers are arranged parallel to the rotary axis direction X along the inner wall 86. However, the conductor wire portions 90*h*, 90*i*, 90*j* may not be arranged along the inner wall 86. For example, the conductor wire portions 90*h*, 90*i*, 90*j* may be arranged to be tilted relative to the rotary axis direction X.

(7) In the above embodiment, the motor unit 50 is used in the fuel pump 10. However, the motor unit 50 may be used in apparatuses other than the fuel pump 10, such as a water pump, for example.

What is claimed is:

1. A brushless motor comprising:
   a rotor; and
   a stator arranged on an outer circumferential side of the rotor,
   wherein the stator comprises:
   a core circumscribing the rotor;
   a bobbin covering the core and comprising a pair of side surfaces along a rotary axis of the rotor, an inner wall located on an inner circumferential side of the pair of side surfaces, and an outer wall located on an outer circumferential side of the pair of side surfaces;
   a conductor wire wound on the bobbin by being overlapped in plural layers; and
   a resin layer covering the bobbin and the conductor wire,
   a profile of the conductor wire becomes larger from an inner circumferential side of the stator towards an outer circumferential side of the stator, and
   among portions of the conductor wire arranged along a rotary axis direction of the rotor on at least one side surface included in the pair of side surfaces and located on an innermost circumferential side of the stator in the respective plural layers, a portion of the conductor wire exposed to the resin layer and separated from the inner wall and the outer wall is tilted from an inner circumferential side of the stator toward the outer circumferential side of the stator.

2. The brushless motor according to claim 1, wherein among portions of the conductor wire arranged along the rotary axis direction of the rotor on the one side surface and located in an outermost layer of the plural layers, a portion of the conductor wire located on the outer circumferential side of the stator is arranged along the outer wall.

3. The brushless motor according to claim 1, wherein a number of turns of the conductor wire increases toward the outer circumferential side of the stator.

4. The brushless motor according to claim 1, wherein among portions of the conductor wire arranged along the rotary axis direction of the rotor on another side surface included in the pair of side surfaces and located on the innermost circumferential side of the stator in the respective plural layers, a portion of the conductor wire exposed to the resin layer and separated from the inner wall and the outer wall is arranged parallel to the rotary axis direction of the rotor.

5. The brushless motor according to claim 1, wherein a surface of the inner wall facing the pair of side surfaces is parallel to the rotary axis direction, and
among the portions of the conductor wire arranged along the rotary axis direction on the one side surface included in the pair of side surfaces and located on the innermost circumferential side of the stator in the respective plural layers, a portion of the conductor wire in contact with the inner wall is arranged parallel to the rotary axis direction.

\* \* \* \* \*